United States Patent Office 3,423,357
Patented Jan. 21, 1969

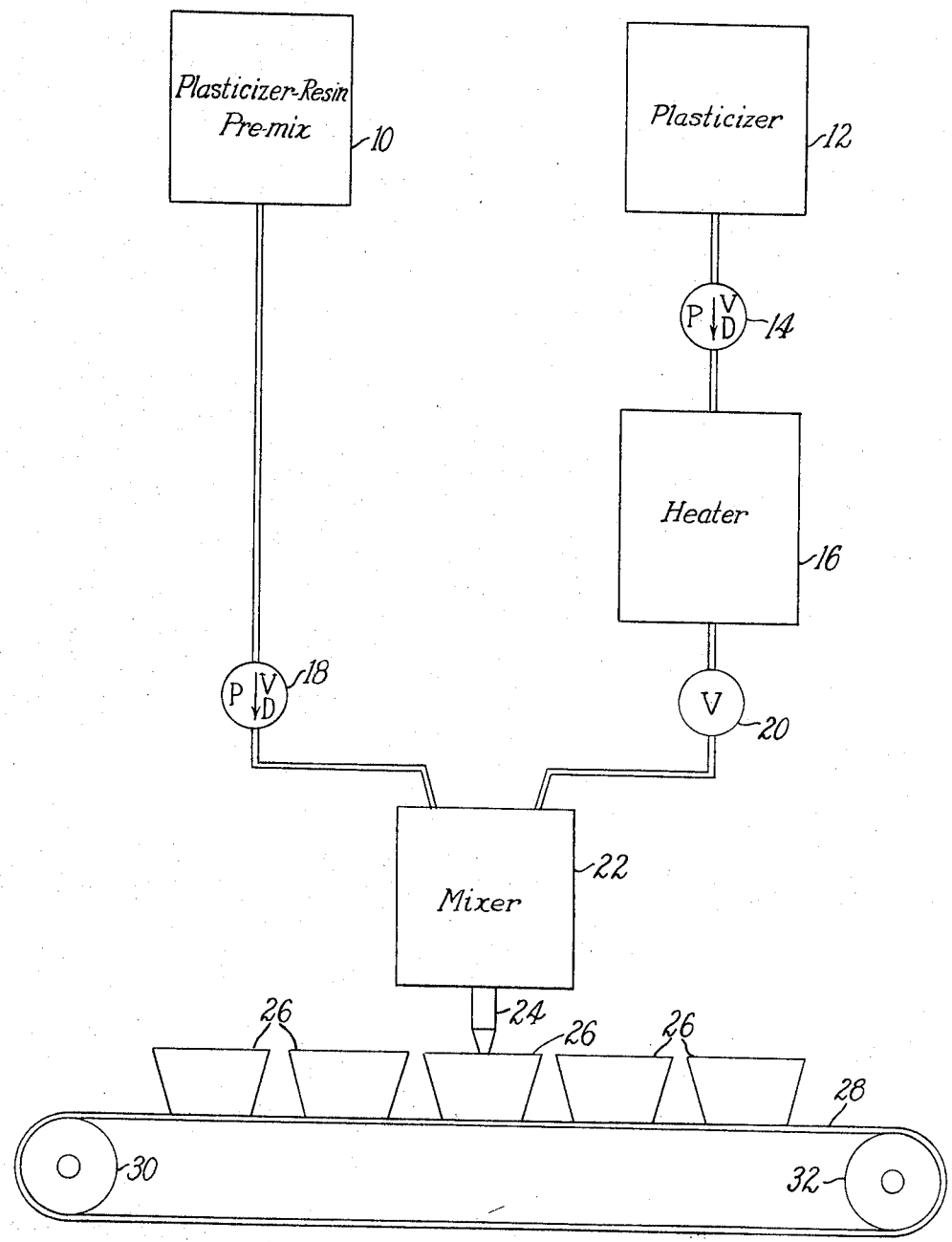

3,423,357
PLASTISOL COMPOSITIONS AND METHOD FOR PROVIDING THE SAME AS ADAPTED FOR MOLDING IN UNHEATED MOLDING SITES
Nam P. Suh, Magnolia, Mass., assignor to United Shoe Machinery Corporation, Flemington, N.J., a corporation of New Jersey
Filed Aug. 30, 1965, Ser. No. 483,611
U.S. Cl. 260—34.2          8 Claims
Int. Cl. C08f 29/18

ABSTRACT OF THE DISCLOSURE

Plastisol adapted for molding in an unheated molding site is provided by mixing plasticizer having a temperature above the plastisol gelation temperature with plasticizer-resin premix having a temperature below the plastisol gelation temperature.

---

The present invention relates to plastisols and particularly to molding plastisols.

Simply defined, plastisols are fluid dispersions of polyvinylidene chloride resins, either polymers or copolymers having particulate form, in plasticizers. Materials used for plasticizing are those having relatively good wetting power and low solvent action on the resin at low or moderate temperatures and, increased solvent action on the resin at elevated temperatures. The result is that plastisols may exhibit good flow property, that is, be fluid or flowable at low or moderate temperatures, and be converted to rubbery, solid form on exposure to elevated temperatures.

In advancing to a solid form on exposure to elevated temperature, plastisols first pass through what may be considered a gelation stage and then a fusion stage; at that latter stage they take on the solid form indicated. For convenience of consideration, the gelation stage may be considered in relation to the change which occurs in a plastisol which is subjected for a period of time to a temperature of about 225° F. to 300° F. so that at least some solvation of the resin into the plasticizer takes place. The change which manifests itself in a plastisol as a result of gelation is that it gels, and loses its fluidity. The fusion stage may be considered in relation to the change which occurs in a plastisol which is subjected for a period of time to a temperature of about 350° F. to 450° F., causing it to convert to a rubbery, solid form.

The properties of plastisols recommend their use as molding compositions or in molding, and, by "molding" it is meant to include the production of shapes, forms, coatings, films, impregnants, adhesives, sealants, etc., formed or shaped in relationship to some forming means which may be a mold, form, shaping member, substrate, support, etc. The good flow property of plastisols in their initial, fluid stage allows them to be rapidly and readily formed with relationship to the form or shape of the object to be molded, coated, etc., and, the moldings obtained as a result of heating the plastisol to be true, free from flaws and homogeneous in consistency.

While the nature of plastisols is such that they recommend themselves to being molded, there are or have been, certain difficulties of a serious nature in molding plastisols.

The first of these difficulties arises because of the tendency of plastisols to gel rather easily at relatively low temperatures, as indicated previously 225° F. to 300° F. Actually they may gel at somewhat lower temperatures provided the exposure to that lower temperature is rather extended. As a result of this tendency, however, the practice in molding plastisols has been to heat them to gelation and fusion temperatures only after their introduction into the molding site. Otherwise if they are heated prior to introduction into the molding site they gel and difficulty is encountered in introducing them into the molding site, and in having them conform to the shape of the mold site in a ready manner. After subjecting to fusion temperature in the molding site, for a predetermined time, cooling is carried out prior to removal of the molded product from the molding site. Generally cooling is carried down to about 200° F. or lower. To return, however, the practice of heating plastisols to gelation or fusion temperature only after their introduction to the mold results in an extended molding cycle, and, it can be appreciated that this has adverse technical and economic effects which greatly limit the use of plastisols for molding and related uses. An insight into the magnitude of these effects can be had by considering the time required for fusing plastisols. In this regard it is fair to estimate that a 0.25 inch thick section of plastisol requires on the order of 10 minutes surface exposure to fusion temperature in order to fuse, while a section 1.0 inch in thickness takes on the order of one hour or more. Various expedients have been developed to overcome the difficulty; however, they only serve to improve the situation somewhat. These expedients do not eliminate the necessity for molding with or in a heated mold or molding site. The expedients referred to include use of anti-gelling agents, high pressure pumping equipment used in conjunction with some preheating of the plastisol and the use of thin-walled molds to reduce heating requirements.

The necessity for molding plastisols in heated molds, molding sites, or of heating them as indicated, only after introduction to a mold or mold site, has served to limit drastically the use of plastisols. They are limited as to locus of operation because of the installation requirements in providing heated molds or mold sites. For example, under such requirements it would be entirely difficult to provide what could be considered conveniently portable molding equipment for molding plastisols which could be used at a given work site or sites, as might be desirable in automotive or architectural uses. Also the requirement of heating the plastisol in the mold or molding site restricts the mold or mold site as to material considerations. Certain materials, which might be otherwise used to form, support, or used in cooperation with forming plastisols, such as various papers, organic polymeric materials, etc. could not withstand the extended heating needed to fuse the plastisol.

Another difficulty, and one that is interrelated insofar as the molding difficulties and procedures previously described are concerned, relates to the chemical nature of the polyvinylidene chloride resins used in plastisols. These resins are prone to decompose under elevated temperature conditions. This may be attributed to the presence of thermally unstable chloride in the polymer making up the resin component. Decomposition is manifested by discoloration, evolution of decomposition products, which may be toxic, and in general deterioration of otherwise desirable physical properties in the plastisol and in the resulting molded plastisol product. Again, various heat stabilizers may be added to the resin or plastisol to improve the situation. However, the results obtained from their use are not entirely satisfactory either from a technical or an economic standpoint.

Accordingly it is an object of this invention to provide an improved plastisol molding method, plastisol molding composition and plastisol molded product.

It is another object of this invention to provide a plastisol molding method capable of being practiced at improved or shortened molding times or cycles in a mold or molding site.

It is another object of this invention to provide a plastisol molding method capable of being practiced in an unheated mold or molding site.

It is another object of this invention to provide a molding method requiring less exposure to heating by the plastisol, and particularly the resin component of the same, than has been previously the case.

It is another object of this invention to provide a plastisol molding method capable of minimizing decomposition of the resin or resin component of the plastisol used in the molding, without the necessity of using heat stabilizers for this purpose.

It is another object of this invention to provide a plastisol molding composition adapted for molding in an unheated mold or molding site.

These and other objects of this invention are obtained in a plastisol molding method, a plastisol molding composition obtainable from a particular type of mixing carried out in practicing the molding method and the molded plastisol product obtainable from practicing the molding method. The plastisol molding composition is obtained from the mixing in which (a) a separate quantity of plasticizer, heated to a temperature above about the gelation temperature for plastisol is mixed with (b) a quantity of plasticizer-resin premix in which the resin is present in essentially or effectively particulate form. As a result of the mixing, the plastisol molding composition obtained is at sufficiently elevated temperature that it may convert to a solid form, that is, a molded plastisol product, when directed into an unheated mold or molding site.

Practiced as prescribed, the method of this invention provides a time period immediately after mixing, during which the heated plastisol molding composition obtained as a result of the mixing, retains sufficient fluidity to allow it to be conveniently directed, transferred or introduced into a mold or molding site. This situation obtains despite the fact that the plastisol molding composition obtained from the mixing may be and generally is at a temperature well above fusion temperature for the plastisol molding composition. This time period, which may be referred to as a transfer period, may extend 20 seconds from the time mixing is initiated. The transfer period may also be considered as occurring in the first section or part of the overall conversion period, which latter is the period during which the plastisol molding composition converts from a fluid to a fused or molded state. The transfer period which is, as indicated, a finite and definable period extends then from the time mixing is initated to that point in time where significant gelation takes place in the plastisol molding composition. The transfer period and similarly the conversion period may be varied somewhat in its extension by choice of temperatures and quantities of material being mixed and various other mixing conditions. The molded plastisol product obtained, despite lack of heating in the mold, has a solid, rubbery form including foamed or nonfoamed structure exhibiting properties which are similar but also improved over those exhibited by plastisol molded products obtained from conventional molding of plastisols. The improvement in properties refers to evidence of less decomposition and resulting improvement in physical properties.

The polyvinylidene chloride resins used in the practice of the present invention may be any of those which are finely divided or particulate in nature and which become coalesced by plasticizer solvation, provided such solvation and coalescence can be prevented at least 100° F. below the temperature at which it is effected.

Of the polyvinylidene resins, the most widely used are the polymers of vinyl chloride. Of the latter, the most commonly used are vinyl chloride homopolymers and copolymers of vinyl chloride and vinyl acetate in which vinyl chloride ranges in amounts of 90–97% by weight. Others which may be used include copolymers of vinyl chloride and dibutyl maleate, ethyl acrylate, methyl acrylate, butyl acrylate, methyl methacrylate, butyl methacrylate, etc., containing substantially the same amount of copolymerized vinyl chloride. In addition, copolymers of vinyl chloride and acrylonitrile containing 45% to 80% vinyl chloride may be used, as well as certain copolymers of vinyl chloride and vinylidene chloride. The polyvinylidene chloride resins preferred for use are the polymers of vinyl chloride polymerized to a high degree as indicated by a specific viscosity of from about 0.7 to 0.31 determined by dissolving a 0.20 gram sample of resin in 100 milliliters of nitrobenzene at 20° ±5° C. Desirable results are obtained by the selection of a resin which is difficult to plasticize. Such resins are commercially available and are generally referred to as "dispersion grade" resins. Generally, they are of smaller particle size than the conventional resins. For example, conventional polyvinyl chloride homopolymer and copolymer resins are often prepared in particle sizes having a diameter ranging from about 5 to about 35 microns. Particle size of dispersion grade resins have a diameter ranging from about 0.02 to about 2.0 microns. Dispersion grade resins are usually of a higher molecular weight than the more conventional resins. The finer particles are particularly advantageous because they can be more readily distributed throughout the plastisol composition thereby insuring homogeneous products.

The plasticizers for use in the present invention include both the primary and secondary type plasticizers.

The primary plasticizers for use are those having low vapor pressures at the fusion temperatures of the plastisols. Plasticizers having a vapor pressure at 400° F. below about 2 mm. give very satisfactory results. Primary plasticizers may be either the monomeric or polymeric type. The monomeric type include dimethyl phthalate, dibutyl phthalates, di-2-ethylhexyl phthalate, dicapryl phthalate, dioctyl phthalate, dibutyl sebacate, dibutyl azelate, dioctyl adipate, dioctyl azelate, dioctyl sebacate, dibutoxy ethyl phthalate, isobutyl acetyl ricoleate, dibutoxyglycol phthalate, trioctyl phosphate, octyldecyl adipate, triethylene glycol di-2-ethylbutyrate and the like and combinations thereof. The polymeric type are represented by the low molecular weight condensates of dicarboxylic acids such as adipic, azelaic or sebacic acids with glycol.

Secondary plasticizers, which are less compatible with the resin or in which the resin is less soluble, can be used with the primary type plasticizers described above. The quantity of secondary plasticizer used is limited by its degree of compatibility with the resin and the primary plasticizer used. Examples of suitable secondary plasticizers are alkyd derivatives of rosin, phenoxyethyl oleates and laurates, chlorinated paraffins, aromatic hydrocarbon condensates, oil base petroleum extended plasticizers, and the like. Good results may be obtained in plastisol molding compositions, with a combination of plasticizers calculated in plastisol molding composition to be obtained as consisting of from about 15% to about 35% by weight of a secondary type plasticizer such as an alkyd derivative of rosin or phenoxyethyl oleate and from about 85% to about 65% by weight of primary plasticizer such as dioctyl adipate or dioctyl phthalate, etc. Although the solvation rate for the primary-secondary plasticizer mixtures may be comparatively low, particularly below 200° F., nevertheless they do not substantially retard the rate of solvation by the resin at temperatures above the fusion temperature.

In the plastisol molding compositions of the present invention the plasticizer may comprise about 20% to about 80% by weight of the total and, it is preferred that it be from about 25% to about 60% of the total plastisol weight. The precise amount selected may be finally determined by the properties desired in the plastisol molding composition and in the products obtained from molding the same, for example, the degree of stiffness required; and also the identity of the particular resin or resins, plasticizer or plasticizers and other additives used in producing the particular plastisol. To further the example, the products desired to be obtained from molding the plastisol molding composition may range over a broad spectrum of uses. Coincidental with that, properties of the products may also widely range. Specifically, then properties desirable with respect to sealants may be expected to be far different from those desirable in a molded product such as a molded shoe sole, heel, etc. As a general rule, however, the final ratio of plasticizer to resin in the plastisol molding composition obtained from mixing may be expected to range 1:2 to 3:1 on a weight basis.

The plastisol molding compositions may include various additives and agents as desired. Among those are fillers such as limestone, clay, talc, asbestos, fiber, wood flour, also pigments and other inert materials, preferably of relatively small particle size. While it is not necessary, there may also be included heat stabilizers such as dibasic lead phosphite, dibasic lead stearate, etc. A convenient rule to follow is that pigments may comprise up to about 15% by weight of the total composition, stabilizers up to 5% by weight and the total filler content may be as high as about 80% by weight. The usual amount of filler is from 30% to 60% of the total weight of the plastisol molding composition. Others of these materials which may be included are foaming or blowing agents, such as sodium bicarbonate, N,N' dimethyl-N,N'dinitroso terephthalamide, etc. Similarly, it may be desirable to include viscosity lowering agents such as the salts of trialkydcarbinylamines as well as various protective colloids. Then too it may be desirable to include thinning agents or thinners such as various of the organic solvents, ketones, hydrocarbons, etc. Still other materials which may be added to improve the adhesive characteristics, as might be desired when the plastisol molding composition as a sealant or coating, are various adhesives such as polyvinyl acetate, and other one part adhesives, epoxies and other multi-part adhesives. The inclusion of adhesives brings up for close consideration the compatibility and thermal stability and activity properties of the adhesive designed for inclusion.

As indicated previously, the plastisol molding method of the present invention includes a particular mixing step or steps by which to prepare a heated plastisol molding composition, which is designed for transfer to or into a mold or molding site. The heated plastisol molding composition has a capacity to be conveniently transferred to or into the mold or molding site within a predetermined time of mixing.

The particular mixing to be used in practicing the invention involves contacting a separate or distinct heated quantity of plastisol with an unheated quantity of plastisol-resin premix. The premix itself may be a plastisol or may be considered as a plastisol or a plasticizer-starved plastisol. By the term "heated" it is meant that the temperature of the plasticizer is above about gelation temperature. In the preferred practice the plasticizer is heated or is at a temperature above about the fusion temperature for the plastisol molding composition at the time of mixing. The term "unheated" as it relates to the plastisol-resin premix refers to a temperature ranging up to about gelation temperature of the plastisol. However, in the preferred practice the temperature for the plasticizer-resin premix at the time of mixing is room temperature.

With mixing as prescribed in practicing the present invention, heating of the resin component of the plastisol molding composition, which is the cause or situs of flow or rheological and decomposition difficulties occurring in plastisols, is kept to a minimum in time and temperature. Through the practice indicated, the time during which the plastisol molding composition or the resin is exposed to heating or elevated temperature is effectively restricted to a period which initiates with mixing the plasticizer-resin premix with the heated plasticizer and extends to that point at which the plastisol fuses in the mold or molding site. As indicated previously, this is a shortened period when compared to heating or the time plastisols are subjected to elevated temperature when conventional molding of plastisol is followed.

In practicing the present invention, the plastisol-resin premix contains less than the amount of plasticizer which is to be included in the plastisol molding composition eventually to be introduced into the mold or molding site. The premix may be prepared in a manner, and by means generally used in preparing plastisols, such as mixers, etc. The amount of plasticizeor to be used in the premix is preferably that which provides the premix with sufficient flow or fluidity so that it is convenient to use conventional fluid-transfer means such as pumps, etc. in transferring the premix at room temperature or unheated condition. The choice of the particular plasticizer and resin for use in preparing the premix will have some effect on this. To elaborate, plasticizers may vary as to viscosity depending upon their chemical and physical properties; while with the resins, the particle size will strongly affect this consideration. In situations where settling out of resin in the premix may be a concern, it may be well to consider use of a resin suspending agent in the premix. Because of the relatively high concentration of resin in the premix this is less of a consideration than in the case with conventional plastisols and plastisol molding.

By way of illustration only, a plastisol-resin premix operates well in practicing the present invention in which the plasticizer to resin weight ratio is 25:75, respectively. This is with reference to a premix in which the resin is a dispersion grade polyvinyl chloride resin and the plasticized is dioctyl adipate. The plastisol molding composition obtained after mixing further plasticizer with the premix could, for example, result in a plastisol-resin weight ratio of 50:50, respectively.

Prior to mixing the plasticizer-resin premix with the separate quantity of heated plasticizer, the premix may be maintained at any temperature up to that at which gelation, to an undesirable amount, occurs in the time taken up in storing the premix. The higher the temperature, however, the more rapid gelation takes place and accordingly, it is suggested that if the premix is to be maintained for any period prior to mixing that it be maintained at room temperature or a lower temperature.

The plasticizer for use in preparing the plasticizer-resin premix may be primary, secondary, or a mixture of primary and secondary plasticizers. It is preferred that for this particular purpose the secondary plasticizers be used. This is for the reason that the secondary plasticizers have less solvation power on the resin. As a result premixes based on secondary plasticizers lend themselves better to storage for extended periods.

In the event that various of the additives, or agents mentioned previously, are to be used, it is recommended that they be included in the plasticizer-resin premix. A partial exception to this may be practiced where a two-part material such as a two-part adhesive is to be included with the plastisol. In such an event it may be desirable to include only one part of that material in the premix. In the last analysis this may be determined on the reaction characteristics of the two parts making up the material.

The separate quantity of plasticizer which is to be heated and mixed with the premix is generally heated to a temperature sufficiently high so that on mixture with the plasticizer-resin premix, the plastisol molding composition which results has a temperature above about the fusion temperature of the plastisol. There may be instances where less heat is provided to the separate, heated quantity of plasticizer as where it is desired to practice the invention by providing some heating or postheating, to the plastisol molding composition obtained from mixing, either prior to or during its introduction to a mold or molding site. To return to the general practice, however, the extent to which heating of the separate quantity of plasticizer is carried out will depend to some extent upon material amounts and considerations as well as other conditions. Using the illustration referred to previously, the quantity of plasticizer may be heated to a temperature of between 350° F. to 600° F., and preferably 450° F. to 550° F.

The separate quantity of plasticizer may constitute a primary, secondary, or a mixture of primary and secondary plasticizers. However, it is preferred that it be primary or a mixture of primary and secondary plasticizers, in which the amount of secondary plasticizer in the mixture is relatively small.

Heating of the separate quantity of plasticizer to the temperature desired, can be effected at any convenient rate of heating. It is recommended, however, that heating be carried out at a rate such that vaporization of the plasticizer is kept to a minimum. This is best effected by gradual heating. Gradual heating is also recommended as being most capable of providing uniform temperature throughout the heated, separate quantity of plasticizer. The rate of heating for the separate quantity of plasticizer will be somewhat determined by the identity of the particular plasticizer used.

The time taken in mixing the separate quantity of heated plasticizer with the plasticizer-resin premix is, as indicated previously, of considerable importance. This determines the rate at which mixing is to be carried out. The time period available for mixing is in turn dependent somewhat on temperature considerations, that is the temperature of the heated separate quantity of plasticizer, the temperature of the plasticizer-resin premix and also the quantity of heat energy or frictional heat introduced by the mixing method and means used to effect mixing. Mixing between the heated plasticizer and the plasticizer-resin premix should be carried out as rapidly as possible. Once contact between the heated plasticizer and the plasticizer-resin premix is made the mechanism of gelation-fusion is initiated in the plastisol molding composition provided as a result of mixing. Gelation to any significant extent developing prematurely or during mixing in the mix may interfere considerably if not completely with effecting further mixing of the heated plasticizer throughout or with the plasticizer resin premix. In addition to that, the development of any significant gelation similarly may interfere with transfering the plastisol molding composition to a mold or molding site. As a result then mixing should be carried out within a time period and at a rate such that first, effective mixing or diffusion of the heated plasticizer throughout the plasticizer-resin premix is obtained and secondly, some time period after mixing is allowed in which to transfer the plastisol molding composition obtained from that mixing, to the mold or molding site without in either case undue interference to these operations being introduced as a result of significant gelation developing in the plastisol molding composition.

There are some practical considerations which may be considered here, for example, the time for mixing and transfer may be extended somewhat at the sacrifice of economics, that is, by including high pressure pumps, etc. Under ordinary conditions, however, it is desirable to avoid this. The time gained is so short as not to warrant serious consideration of the alternative suggested. Not only that, but the method of this invention is adapted to being relieved of such problems simply by choosing amounts to be mixed at any time, as by incremental mixing of smaller or partial batches which may be combined or recombined in the mold or molding site, etc. In this regard the method lends itself to less than batch or partial batch, batch, continuous or combination batch and continuous operations, provided only that any amount in which mixing is initiated is transferred into the mold or molding site within a time period which allows it to be done conveniently. It is recommended that mixing and transfer of the heated plastisol molding composition obtained from mixing be carried within a period of 20 seconds of contacting or mixing the heated plasticizer with the plasticizer-resin premix in significant amounts. This period, previously referred to as the transfer period may range with respect to specific plastisol molding composition from about 3 seconds to about 20 seconds. The higher the amounts of resin in the composition the period becomes shortened, or as resin content increases it can be expected that the transfer period becomes shortened. Under the usual circumstances of practicing the invention it may be expected that the transfer period ranges about 10 to 15 seconds.

As indicated previously, there may be occasion to provide the plastisol molding composition with postheating. This may take place during the mixing step or after mixing, the latter referring to that which might be carried out during transfer to or after transfer to the mold or molding site. Various types of heating may be used to effect that, including the use of exothermic materials. Such an occasion may arise when it is desired to produce a molding or molded product having a foam or cell structure.

The present invention is illustrated with reference to the following drawing in which:

The figure is a diagrammatic sketch of means and method expedients for providing plastisol moldings.

As shown in the figure reservoir 10 is designed to hold a quantity of plasticizer-resin premix. The premix may be and preferably is maintained there at room temperature. As indicated previously the temperature of the premix may be up to gelation temperature but, it is preferred that the premix be maintained there under room temperature conditions. This allows it to be kept in the reservoir 10 in larger quantities and for longer periods of time prior to mixing.

A second reservoir 12, holds a separate quantity of plasticizer which is to be heated prior to mixing with the quantity of plasticizer-resin premix contained in reservoir 10. Heating of the separate quantity of plasticizer may be carried out in reservoir 12 if desired, and, if heating is carried out there it may be in the nature of preheating, partial heating or complete heating. In the event the latter possibility is practiced, heating is to a temperature above about the fusion temperature and preferably 450° F.–550° F. As represented in the drawing, however, the separate quantity of plasticizer is directed from reservoir 12, where it is maintained at room temperature, through variable delivery pump 14 and into heater 16, where heating to the desired temperature is carried out.

A variable delivery pump 18 is included to pump plasticizer-resin premix, in metered amounts, into mixer 22. Similarly, variable delivery pump 14 is employed to pump the separate quantity of plasticizer, after heating through valve 20 and into mixer 22. The reference to pumps 14 and 18 as variable delivery type indicates that the mixing and molding method is adapted to be carried out on less-than-batch, batch, continuous or combination batch-continuous basis.

Mixer 22 may be any high speed mixer or include any high speed mixer head, not shown, adapted to rapidly mix the quantities of material introduced into the same. As indicated previously the time and manner in which this mixing is carried out is limited.

After mixing, the heated plastisol molding composition, which preferably has a temperature above fusion temperature, is delivered from mixer 22 through nozzle 24 into one or more molds 26. As shown, the mixing and molding operation may be carried out on a continuous basis to ultimately fill a number of molds which are advanced on moving belt 28 fitted over rolls 30 and 32. The means used in practicing the present invention may be adapted for portable as well as permanent installation. The former is attractive from the standpoint of adapting the invention for use as in providing plastisol sealants or coatings, as for example, in various architectural uses, filling cracks, seams, etc. in building, etc. Another area where this embodiment is particularly attractive is in automobile building and reconditioning, again in providing plastisols as coatings and sealants, particularly on the undersides of automobiles where they serve to provide sound damping and weather resistance coatings and sealings to those units.

The following example is provided for the purpose of illustrating the invention.

EXAMPLE I

(A) Materials preparation

(1) PREMIX PREPARATION

Premixes having the following formulations are prepared:

| Premix 1–a (Component): | Amount (p.p.w.) |
|---|---|
| Polyvinyl chloride (homopolymer particle size 1.7 microns) | 100.0 |
| Dioctyl adipate | 30.0 |
| Dibasic lead phosphite | 1.5 |
| Polyethylene glycol mono-oleate-400 | 1.0 |

| Premix 1–b (Component): | Amount (p.p.w.) |
|---|---|
| Polyvinyl chloride (homopolymer particle size 1.7 microns) | 55.0 |
| Polyvinyl chloride (homopolymer particle size 20 microns) | 45.0 |
| Dioctyl azelate | 25.0 |
| Alkylphenoxy polyoxyethylene ethanol | 1.0 |

| Premix 1–c (Component): | Amount (p.p.w.) |
|---|---|
| Vinyl chloride-vinyl acetate copolymer (particle size 1.7 microns) | 100.0 |
| Oil based petroleum extender plasticizer | 30.0 |
| Expoxidized soybean oil | 5.0 |

| Premix 1–d (Component): | Amount (p.p.w.) |
|---|---|
| Polyvinyl chloride (homopolymer particle size 1.7 microns) | 55.0 |
| Polyvinyl chloride (homopolymer particle size 20 microns) | 45.0 |
| Dioctyl adipate | 20.0 |
| 2-ethyl hexyl acrylate | 20.0 |
| t-Butyl perbenzoate | 0.5 |
| Dibasic lead phosphite | 1.0 |

Each of the premixes above are prepared by charging the components into a paddle-type mixer and mixing at room temperature conditions for a period of 15 minutes. The premixes obtained are white fluids having viscosities on the order of 20,000 centipoises measured in a Brookfield viscometer, fitted with a No. 4 spindle and operated at 4 r.p.m.

(2) SEPARATE PLASTICIZER PREPARATION

The following plasticizers are used either alone or in combination:

2–a: Dioctyl phthalate
2–b: Tricresyl phosphate
2–c: Polyethylene adipate

(B) Mechanical arrangement

The means, earlier described with respect to the drawing are arranged in the following specific manner. The reservoirs are each three (3) gallons capacity, of steel construction and have fitted covers capable of hermetically sealing the reservoirs. Copper tubing (0.5 inch) is used to connect the various components. Each of the pumps is a positive displacement gear pump. The heater is a Chromalox heat exchanger including a 12 kw., 240 volt, 3 phase resistance heating unit. The heater is fitted with a thermostatic control and has a watt density of 22 watts/sq. inch. The valve located after the heater is a high pressure steam type valve. The mixer includes a mixing head having a Teflon-coated tapered helix mixing screw. The screw is 3 inches in effective length, 0.75 inch at its smaller end and 1.5 inch at its larger end, both measurements taken across flights. The helix carries through five turns over the length of the screw. The flight depth is 0.375 inch at the larger end and 0.125 inch at the smaller end. The extrusion nozzle has a cross-sectional area of 0.0625 sq. inch. The molding sites include thin walled aluminum molds, unsupported burlap fabric and a metallized travelling belt.

(C) Operation

A quantity of premix and of separate plasticizer preparation chosen from those identified in subparagraph A above, are charged into the reservoirs of the means described in subparagraph B, above. Each of the valves is set to operate at 60 r.p.m., and the heat exchanger is set to heat the separate quantity of plasticizer to 570° F. as it leaves the heater. The mixing head is set to operate the mixing screw at 3000 r.p.m. The ratio of plasticizer to premix feed is set at 1.5 to 1.0, and the delivery of plastisol molding composition at 45 pounds per hour. On operation the plastisol molding composition obtained from the mixing head has a temperature of 350° F.

The operation is carried out with all of the premixes and separate quantities of the various plasticizers identified in paragraph A above; each run is continuous in nature for 5 minutes serving to deliver on the order of 7 pounds, 10 ounces of plastisol molding composition.

The plastisol molding compositions are directed through the nozzle and into the indicated molding site including the unheated thin wall molds. In all instances, the molded products cool quickly and in instances where they are delivered to the molds to form moldings having sections 1.0 inch thick, the products can be removed from the mold within a period of 2 minutes. The molded products obtained from the mold are all rubbery solids in nature, indicating they are well fused, they also show excellent conformation to mold containers, they are clear, indicating good admixing and solvation of resin by the plasticizer used. None of the molded products obtained evidence any deterioration or discoloration due to thermal conditions.

When the method is practiced to produce plastisol-burlap fabric laminates, the laminates obtained exhibit good adhesion between the plastisol layer and the fabric. Neither the plastisol nor the burlap show any thermal deterioration. The plastisol exhibits the same good properties as are obtained in the plastisols obtained from the products produced in the molds. In practicing this embodiment of the invention, the burlap material is passed between reels located at either side and below the nozzle delivering the plastisol molding composition. After delivery onto the fabric, the plastisol molding composition is spread to a uniform thickness of 0.25 inch using a spatula. The laminate sets up in a period of 30 to 45 seconds.

In another embodiment, the plastisol molding composition is delivered from the nozzle into surfaces of a metal strip having a patterned surface. The metal strip is unheated that is, it is maintained at room temperature and the plastisol molding composition is spread to a thickness of 0.10 inch using a spatula and is allowed to cool under room conditions. The coating or film obtained is noted to have excellent conformation with the patterned surface of the object. The film can be stripped from the metal within a period of 30 seconds.

As indicated previously the molded products obtained from practice of the present invention have utility in those areas where plastisols obtained from conventional molding or molding practices are used. These include as moldings, coatings, such as wire coatings, coatings on metals, glass, ceramics and plastic materials such as nylon, etc. They may also be used in conjunction with paper, fabrics and other materials which were previously unavailable for use following conventional procedures. In instances it may be desirable to use primers to improve the adhesion of the coatings to the various substrates. However, the necessity for primers may be eliminated by inclusion of adhesives in the plastisol molding composition as previously referred to. The plastisol molding compositions obtained from practice of this invention may also be used to produce films, sealants, impregnants, etc., and again this may be in conjunction with primers, or primer substitutes.

It will thus be seen that the objects set forth above, among those made apparent from the preceding description are efficiently attained and since certain changes may be made in carrying out the above mixing and molding methods and in the plastisol molding compositions and products set forth above without departing from the scope of the invention it is intended that all matter contained in the above description and shown in the accompanying drawing shall be interpreted as illustrative and not in a limiting sense.

Having thus described my invention, what I claim as new and desire to secure by Letters Patent of the United States is:

1. A method for providing a plastisol molding composition adapted to be molded in an unheated molding site which comprises mixing (a) a quantity of plasticizer having a temperature above about gelation temperature for plastisol with (b) a quantity of plasticizer-resin premix in which the resin is present in essentially particulate form, the quantity of plasticizer being sufficient to provide the plastisol obtained on mixing at a temperature above about the gelation temperature for the same.

2. A method according to claim 1 wherein the (a) quantity of plasticizer has a temperature above about the fusion temperature for plastisol.

3. A method according to claim 1 wherein the (a) quantity of plasticizer has a temperature ranging from about 350° F. to about 600° F.

4. A method according to claim 1 wherein the (b) quantity of plasticizer-resin premix has a temperature below about the gelation temperature of plastisol.

5. A plastisol molding method which comprises providing a heated plastisol molding composition by mixing (a) a quantity of plasticizer having a temperature above about gelation temperature for plastisol with (b) a quantity of plasticizer-resin premix in which the resin is in essentially particulate form, the quantity of plasticizer being sufficient to provide the plastisol obtained on mixing at a temperature above about the gelation temperature for the same, and directing the heated plastisol molding composition into a molding site.

6. A plastisol molding method according to claim 5 wherein the (a) quantity of plasticizer has a temperature above about the fusion temperature for plastisol.

7. A plastisol molding method according to claim 5 wherein the (a) quantity of plasticizer has a temperature ranging from about 350° F. to about 600° F.

8. A plastisol molding method according to claim 5 wherein the (b) quantity of plasticizer-resin premix has a temperature below about the gelation temperature of plastisol.

References Cited

UNITED STATES PATENTS

| 2,600,122 | 6/1952 | Meyer et al. | 260—34.2 |
| 2,689,713 | 9/1954 | Staller | 260—34.2 |
| 2,718,471 | 9/1955 | Samler | 260—34.2 |
| 3,048,557 | 8/1962 | Siddall | 260—31.8 |
| 2,729,627 | 1/1956 | Carr | 260—31.8 |
| 2,912,400 | 11/1959 | Olson | 260—31.8 |

OTHER REFERENCES

Penn: PVC Technology, Maclaren & Sons, Ltd., 1966, p. 352, Sci. Lib.

MORRIS LIEBMAN, *Primary Examiner.*

L. T. JACOBS, *Assistant Examiner.*

U.S. Cl. X.R.

260—30.6, 31.8